INVENTOR
Augusto Dina
BY
ATTORNEY

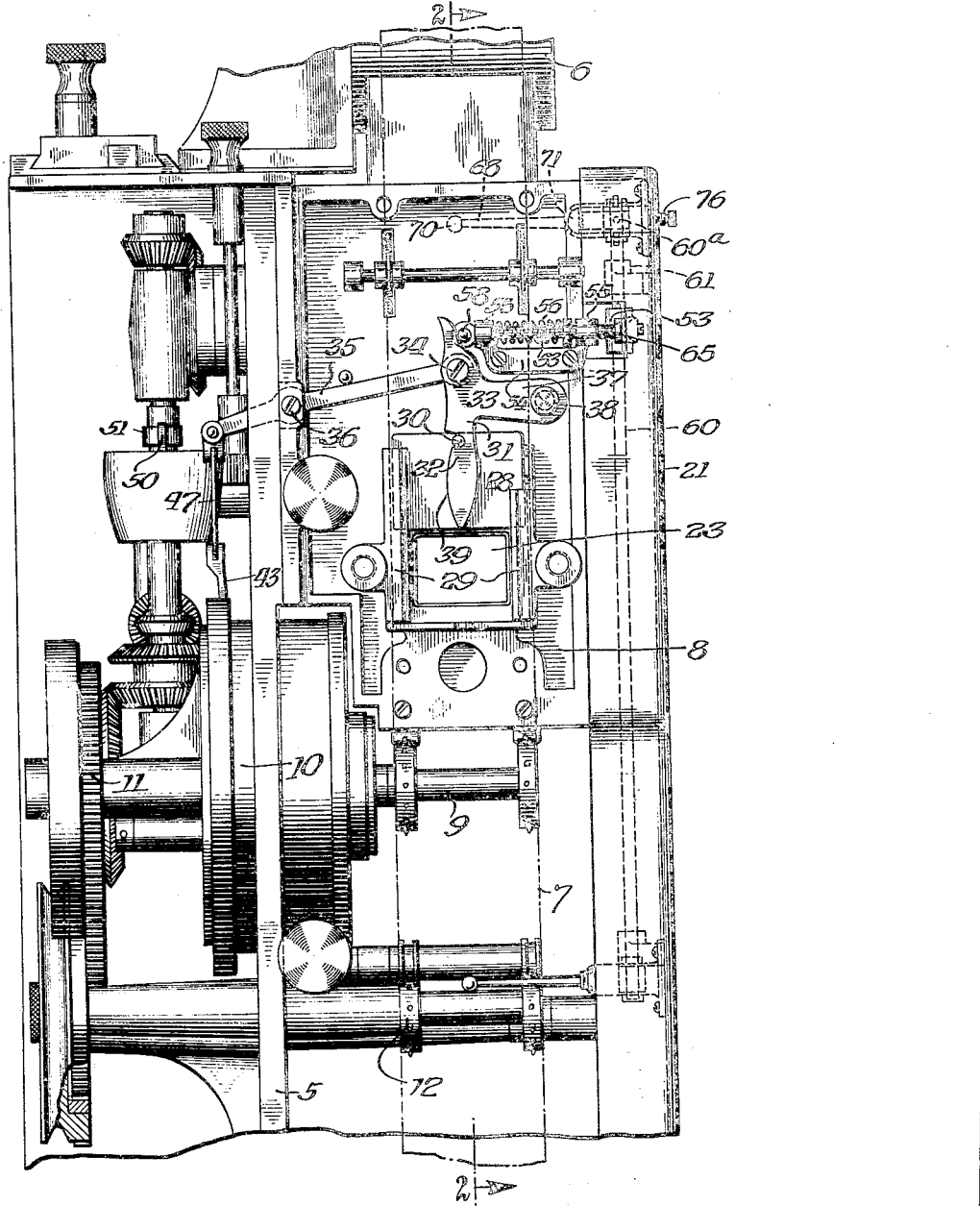

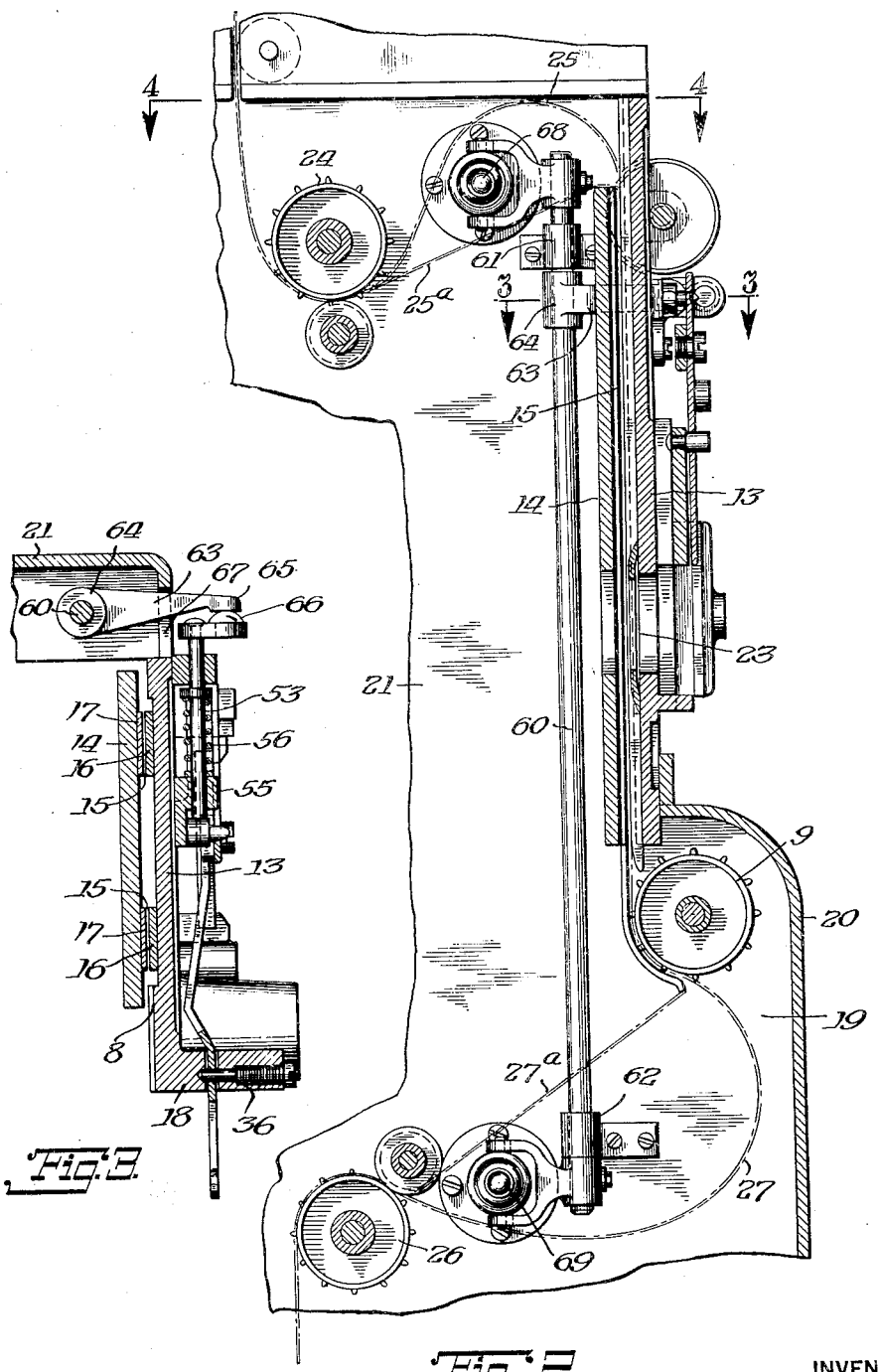

March 11, 1930.  A. DINA  1,749,971
FIRE SHUTTER AUTOMATIC RELEASE
Filed Sept. 5, 1925    4 Sheets-Sheet 4

INVENTOR
Augusto Dina
BY
Pierre Carpenter
ATTORNEY

Patented Mar. 11, 1930

1,749,971

UNITED STATES PATENT OFFICE

AUGUSTO DINA, OF JERSEY CITY, NEW JERSEY, ASSIGNOR TO THE PRECISION MACHINE CO., INC., OF NEW YORK, N. Y., A CORPORATION OF NEW YORK

FIRE SHUTTER AUTOMATIC RELEASE

Application filed September 5, 1925. Serial No. 54,621.

This invention relates broadly to motion picture projectors and more particularly to improved means for preventing ignition of the film due to heat from the projection lamp, together with improved means for operating the shutter into and out of closed position and for automatically releasing the shutter to closed position in the event of predetermined changes in the operation of the machine.

Those skilled in the art are familiar with the practice in motion picture projectors of employing a film gate which usually is provided with an aperture through which the light is projected and across which the film is intermittently moved, suitable film feeding mechanism being provided for propelling the film across said aperture. In the normal operation of the film, the duration of its exposure to the light is so short that no danger of fire exists, but in the event of a stoppage of the film, or some times in the event of the breaking of the film, the latter becomes caught in the film guide and may become ignited. It is also common practice to thread the film and feed it so that two loops are provided one above and one below the film gate, this being for the purpose of preventing undue strains on the film and to avoid the film making sharp angles. Unless these loops are maintained the film will be unevenly fed and may be subjected to strain which will cause it to break, in which event a part of the film will be left exposed to the light and eventually become ignited even though the projection mechanism may continue to operate.

It has, furthermore, been common practice to provide an automatic means for moving the shutter into and out of closed position, the means generally including speed responsive mechanism connected to the shutter for serving to maintain it away from the aperture as long as the machine operates at a predetermined rate of speed. In the event of one of the loops of the film being eliminated, or the film placed under a greater strain to the extent that these loops are reduced to a predetermined extent, the film becomes placed under a strain which may cause it to tear or break entirely, and while the projector mechanism continues to operate at the same speed a part of the film might be left in the film gate, with the shutter maintained in open position, and result in a conflagration.

The principal objects and advantages of this invention reside in the provision broadly of an improved means for releasing the fire shutter to closed position or effecting its movement into closed position upon predetermined distortion of the film or upon the film being placed under a predetermined undue tension and to do this regardless of the automatic mechanism for maintaining the shutter in open position during a projection; the provision of an improved means actuated by the film itself for releasing the shutter upon the film being placed under a predetermined tension; the provision of an improved connection between the film and an automatic shutter operating mechanism for effecting movement of the shutter to closed position irrespective of the automatic mechanism; the provision of an improved mechanism in combination with a speed responsive device and a shutter, which includes improved means for disconnecting the shutter from the speed responsive device upon the occurrence of predetermined events in the operation of the film; the provision of such means last before mentioned operated by the film itself through intermediate mechanism for causing the fire shutter to move to closed position upon the film becoming distorted in operation; and the provision of a mechanism of the character described which may be applied to standard types of projectors now in use without material alteration of the structure of the projecting mechanism or of the shutter.

The foregoing and such other objects and advantages as may appear as this description proceeds are attained in the structural embodiments of this invention illustrated in the accompanying drawings, in which Fig. 1 is an elevational view of a fragment of the motion picture projector;

Fig. 2 is a vertical sectional view taken on the line 2—2 of Figure 1, looking in the direction indicated by the arrows;

Fig. 3 is a horizontal sectional view taken on the line 3—3 of Figure 2, looking in the direction indicated by the arrows;

Figure 4:
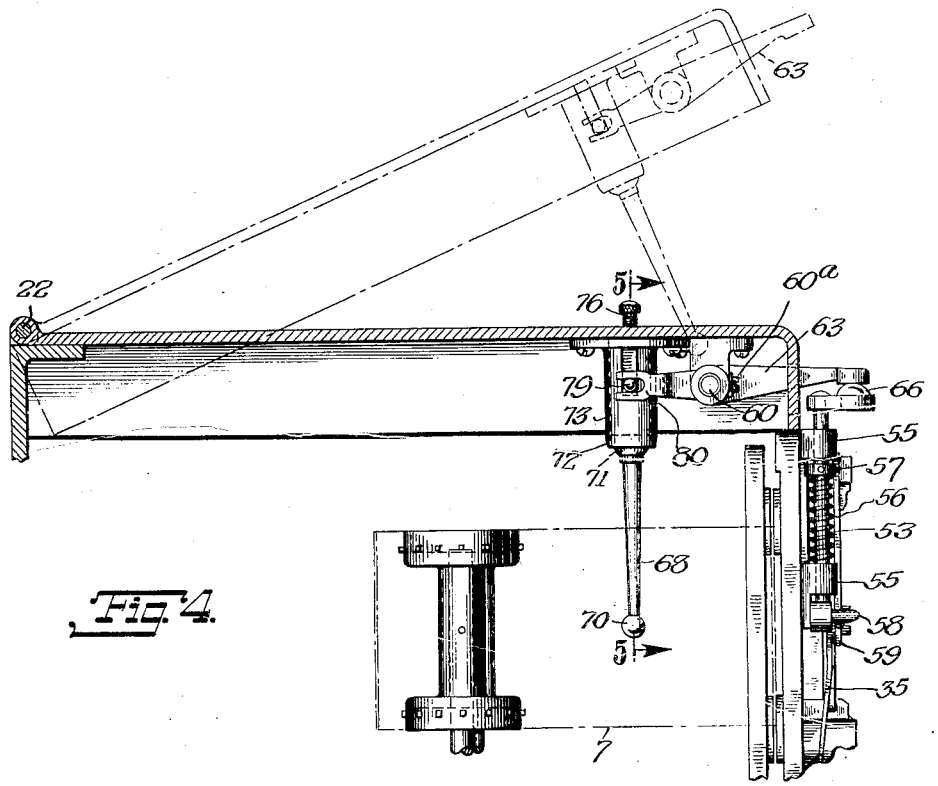
Fig. 4 is a horizontal sectional view taken on the line 4—4 of Figure 2, looking in the direction indicated by the arrows.
Figures 5, 7:
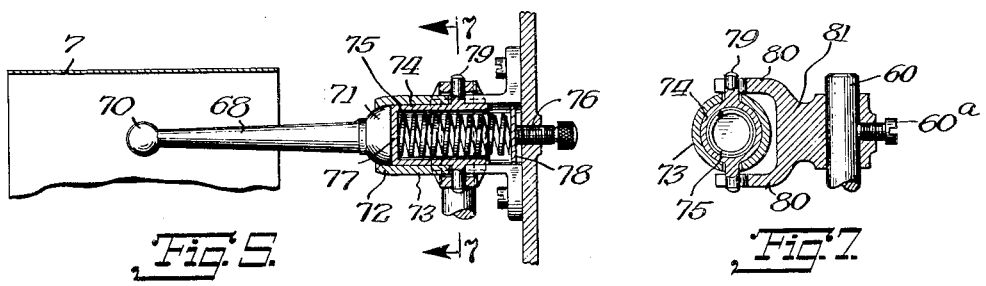
Fig. 5 is a horizontal sectional view taken on the line 5—5 of Figure 4, looking in the direction indicated by the arrows.
Fig. 7 is a sectional view taken on the line 7—7 of Figure 5, looking in the direction indicated by the arrows.

Referring more particularly to the drawings and first to the Figures 1 to 9, inclusive, Figure 1 shows the frame 5 of a motion picture projector, this frame supporting the film feeding mechanism and one of the film containers 6, the latter being shown at the top of Figure 1, and the film 7 issuing from said container and passing down through the film gate, generally designated 8.

The film feeding mechanism may be of any standard construction, but for the purposes of this invention may include the film feeding or intermittent sprocket 9 operated by an intermittent feed mechanism contained in a casing 10 operated by suitable gearing 11. As the film feed mechanism does not enter into the present invention in detail, a description thereof is not at this time necessary.

The film passes over the intermittent sprocket 9, thence to a continuously operated sprocket 12 and to the receiving film container (not shown).

The film passes through a film gate such as indicated at 8, and this film gate comprises (as shown here) the front or outside portion 13 which is shown in the form of a door a so-called pad 14 being movable relatively to said door, a slight space 15 being afforded between strips 16 and 17 complementally arranged and carried by the front and rear portions 13 and 14, respectively, of said film gate 8.

The front portion 13 of the film gate is provided with a flange 18 by which it may be fixedly secured to the frame 5.

The intermittent sprocket 9, and, in fact, substantially all of the film feeding mechanism is contained in a casing 19 which includes a wall 20, said wall co-operating with the film gate to substantially completely close one end of the casing. One side of the casing is open and a removable wall 21 may form a closure therefor, this closure being hinged at a convenient point such as at 22, in Figure 4, to permit access to the film feeding mechanism for threading the film and for other purposes.

The inner and outer portions 13 and 14 of the film gate are provided with a projection aperture generally designated 23, the film passing across said aperture between the strips 16 and 17 and the light being projected through said aperture for throwing the images on the screen in the conventional way.

As the film enters the casing 19 from the film container 6 it passes through the feeding roller 24 and this feeding roller is adapted to move at a speed which will cause a loop 25 to be formed in the film above the film gate, and complementally, a feed sprocket 26 is disposed below and for receiving the film from the intermittent sprocket 9 and operates at such a speed as to form a loop 27 in the film below the film gate. This is common practice in motion picture projectors and does not enter into the present invention except in so far as any departure of the film to a predetermined extent from the contour shown in Figure 2 causes an operation of the mechanism of the present invention. It will be appreciated that it is essential that the film follow a contour substantially like that shown in Figure 2 and that it does not continuously and for an appreciable length of time assume a contour such as that shown at 25$^a$ and 27$^a$ in Figure 2, which would necessitate the film going over a sharp corner at the top of the film gate and at the bottom thereof. Such an occurrence not only prevents proper framing of the picture but tends to score or scratch the surface of the film, or might even cause a breakage of the film or a tearing of the perforations therein.

While the danger from ignition of the film is not imminent so long as the film keeps moving, the danger of the breaking of the film is at least imminent, and the device of the present invention, as will hereinafter appear, serves to function as a signal to the operator that something is wrong with the feeding of the film. This signal in the present instance is produced by the operation of a shutter such as indicated at 28 to cause this shutter to move across the aperture 23 and terminate the projection of the pictures on the screen. The shutter 28 operates in a suitable guiding frame 29 which may be of suitable form and engages the side margins of the shutter, which latter is interposed between the projection lamp and the film.

In the present instance, the shutter 28 is provided with a fixed pin 30 in alignment with the vertical axis of the shutter and near the top edge thereof, this pin being received in a recess 31 formed in a depending leg 32 of the bell crank link 33, said link 33 being in the nature of a ratchet and serving as a suspending connection between the shutter and the automatic operating mechanism therefor. The link 33 is pivotally connected at 34 to the inner end of the lever 35, which latter is pivoted at 36 on the flange 18. The normal tendency of the link 33 is to engage the pin 30 by virtue of the lateral extension 37 being counter-weighted as at 38, the depending leg 32 of the link 33 having a curved edge 39 which will facilitate engagement of the notch 31 in the link with said pin 30 after the disengagement of these two elements.

Normally in the operation of a projector when projecting pictures, the mechanism is in the position shown in Figure 1, that is, the inner end of the lever 35 is raised, thus sustaining the shutter away from the aperture 23 and permitting projection of the pictures.

Figure 9:
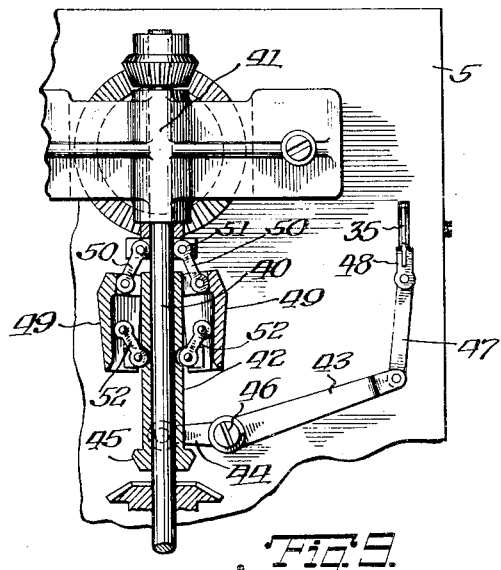
Fig. 9 is a vertical sectional view of the speed responsive device and governor, taken on the line 9—9 of Figure 8, looking in the direction indicated by the arrows.

The mechanism for sustaining the shutter takes the form of a speed responsive device, or governor, the details of which are shown best in Figure 9.

This governor is mounted on a vertical shaft 40 driven by the feeding mechanism of the apparatus in any suitable manner, and this shaft is mounted in a suitable bearing 41 secured to the frame 5. The governor includes a sleeve 42, which is rotatable with the shaft 40, and vertically slidably mounted thereon, said sleeve being connected at its lower end to a lever 43 by the provision of a yoke 44 and an annular flange 45 carried by said sleeve so that elevation of the sleeve causes a tilting of the lever 43 about its pivot 46 and through the link connections 47 and 48 produces an elevation of an inner end of the lever 35.

The sleeve is elevated by the provision of a plurality of weighted members 49—49 which are suspended by links 50 from a collar 51 secured to and rotatable with the shaft 40, rotation of the shaft tending to cause the weights to move radially by centrifugal action, and said weights, by virtue of the link connections 52 to said sleeve 42, causing said sleeve to rise on the shaft 40. It will be observed that the natural tendency of the governor, including its weights 49, links 59 and the sleeve 42, is to assume the contracted position shown in Figure 9, and that the natural tendency of the shutter is to fall by gravity across the aperture 23. Therefore, the likelihood of the shutter becoming stuck and not closing the aperture is largely eliminated as the weights act positively in both directions, that is, by centrifugal force to raise the shutter and by their own weight and by the weight of the sleeve 42 and the weight of the shutter to cause said shutter to descend to close the light aperture 23.

This mechanism takes care of any stoppage of the projecting mechanism to prevent ignition of the film or any slowing down of the feeding mechanism due to carelessness on the part of the operator or even in the event of fracture of any of the link members 47, 48 and 35.

However, this mechanism does not take care of changes in the movement of the film such as illustrated in Figure 2, and to this end the mechanism hereinafter described is provided. In order to cause the shutter to be dropped to closed position in the event of the loops 25ª and 27ª being eliminated or materially reduced in size, I provide means for automatically disconnecting the link 33 from the shutter to permit the shutter to drop by gravity into closed position. This mechanism takes the form, in Figures 1 to 9, of a reciprocating rod 53 mounted in a suitable bracket 54 having bearings 55 for said rod. The bracket 54 is fixedly secured to the outer part 13 of the film gate above the upper limit of movement of the link 33, said rod 53 being constrained against free movement in one direction by the provision of a helical spring 56 which surrounds the rod 53 and abuts one of the bearings 55 and a collar 57 formed on said rod.

The inner end of the rod 53 is provided with an enlarged head 58 which is adapted to engage with a finger 59 formed integrally with the link 33 and projecting vertically above the pivot 34 into the path of movement of the head 58 when said rod is reciprocated to a predetermined extent.

Movement of the rod in a plane transversely to that of finger 59 is accomplished by the provision of mechanism carried by the wall 21 and arranged so that when said wall is moved to open position, said mechanism will readily disengage from the rod, thereby preventing any interference with the opening of the wall by the shutter releasing mechanism.

The actuating mechanism for releasing the shutter includes a vertical shaft 60 mounted for limited rotation in bearings 61 and 62 secured to the said wall 21, said shaft lying at one side of the film gate and to the rear of the portion 14 thereof.

Figure 8:
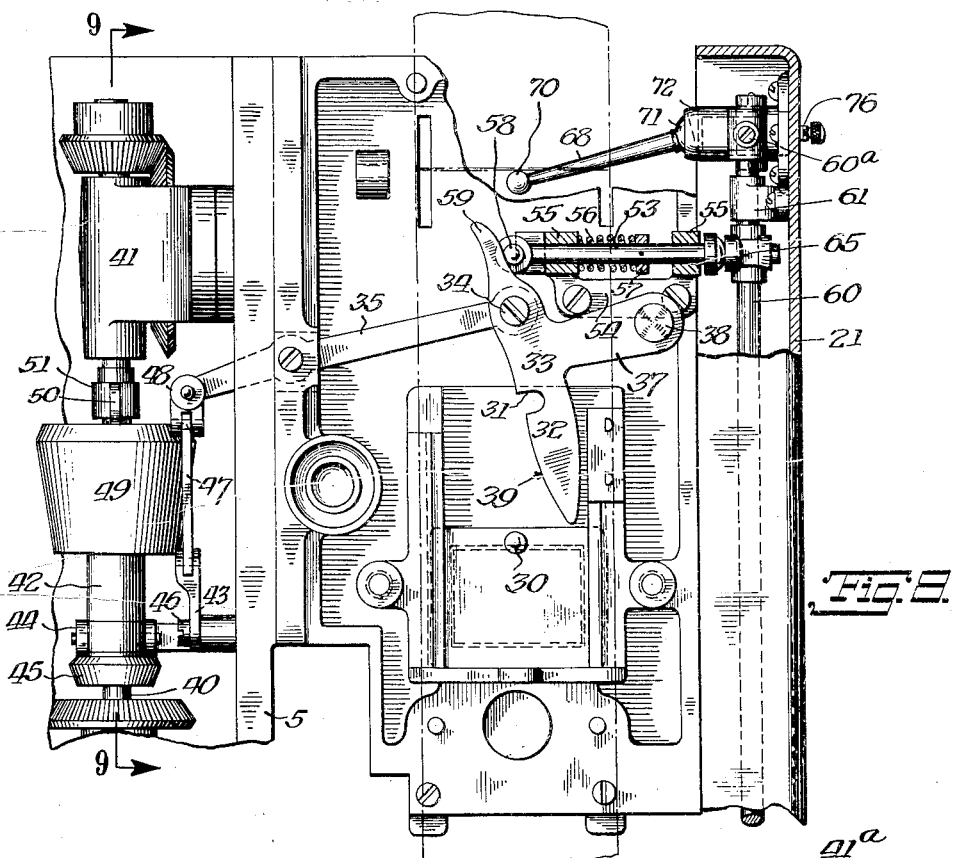
Fig. 8 is an enlarged fragmentary elevational view showing the structure of Figure 1 and parts thereof in section, the parts being shown after an operation thereof has taken place.

The shaft 60 is provided with a radial arm 63 provided with a hub 64 fixedly secured to said shaft 60, and said arm is provided with an enlargement 65, which, when the door is closed, is adapted to engage a head 66 secured to the outer end of the rod 53, as best shown in Figures 3 and 8. A suitable aperture 67 is provided in the end portion of the wall 21 to accommodate the arm 63. It will be seen that when the shaft 60 is oscillated the rod 53 will be caused to reciprocate in its bearings against the tension of the spring 56 and thus cause the head 58 to tilt the finger 59 and move the link 33 to the position shown in Figure 8, thereby disengaging the notch 31 from the pin 30 and allowing the shutter to fall to closed position as shown in Figure 8.

The shaft 60 is oscillated or partially rotated by either one of two feelers which are disposed at opposite ends of the shaft in the path of movement of the loops 25 and 27 of the film when distorted.

Figure 6:
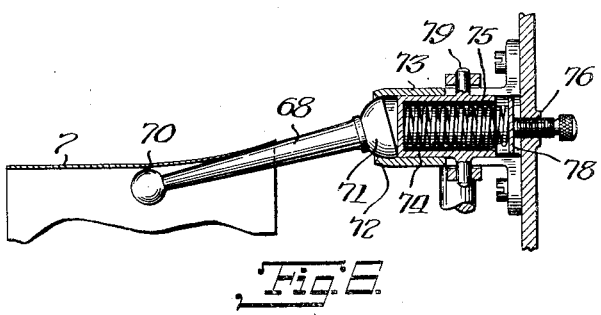
Fig. 6 is a view similar to Figure 5, showing one of the detailed parts in a different position.

These feelers, as best shown in Figures 4, 5, 6 and 8, conveniently comprise tapered arms 68 and 69, the free ends of said arms being provided with spherical members 70 so that when the film 7 engages therewith, as shown in Figure 6, no damage to the film will result.

The inner ends of the arms 68 are provided with hemi-spherical portions 71 seating in complemental seats 72 in supporting members 73, the said supporting members being cylindrical and forming bearings for a slidably mounted inner tube 74. The inner tube 74 is constrained against movement in one direction by helical spring 75, the tension of which is adjusted by the provision of a set screw 76, said spring being disposed between the outer end 77 of the inner tube 74 and a plate 78 actuated by said set screw 76.

It will be seen from Figure 6 that when the arm 68 is displaced from axial alignment with the cylindrical bearing member 73, the inner tube 74 will be longitudinally displaced in said bearing member 73 against the tension of the spring 75. The inner tube 74 is provided with trunnions 79—79 which engage with the arms 80 of the yoke 81, said yoke 81 being fixedly secured to the upper end of the shaft 60 by the provision of the set screw 60$^a$. This sliding movement of the inner tube 74 rotates the shaft 60 in a direction to cause the arm 63 to press upon the head 66 and displace the rod 53, thereby tilting the link 33 about its pivot 34 and permitting the shutter to fall. Due to the fact that the feelers 68 are disposed in the positions shown, these feelers are in the path of the film so that in the event of any distortion of either of the loops 25 and 27 to the positions shown at 25$^a$ and 27$^a$, either or both of the feelers will be displaced to operate the shutter releasing mechanism.

Figure 10:
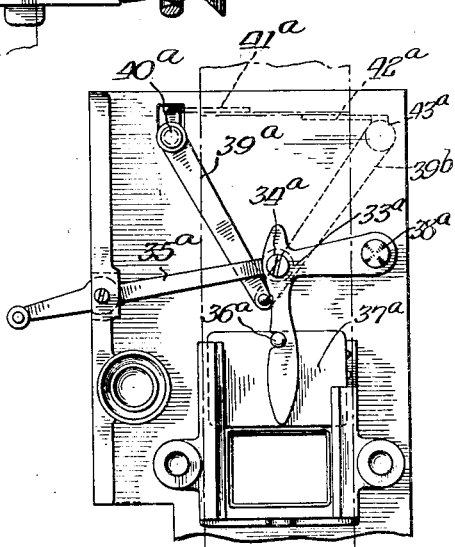
Fig. 10 is an elevational view of a modified form of this invention.

Referring now to Figure 10, a simplified form of the invention shown in Figures 1 to 9 is provided wherein the link 33$^a$, pivoted at 34$^a$ on the lever 35$^a$, is engaged at 36$^a$ with a shutter 37$^a$. The link 33$^a$ is counterweighted at 38$^a$ and may be substantially identical with the link 33 hereinbefore described although the upwardly extending finger in this instance is not necessary.

In this form of the invention, the means for actuating the link 33$^a$ to disengage it from the shutter 37$^a$ includes an arm 39$^a$ pivoted at 40$^a$ on a shaft having a feeler 41$^a$ projecting into the path of the film 42$^a$. The form of the invention here shown is for the purpose of taking care of enlargement of the loops in the film which are greater than required and which might tend to cause tangling of the film. It will be observed that the finger 41$^a$ will be engaged by the film in the event that the loop enlarges, thereby causing the finger 41$^a$ and arm 39$^a$ to disengage the link 33$^a$ from the shutter and permit the same to drop. This form of the invention may be made to operate like the form shown in Figures 1 to 9 by merely reversing the position of the shaft 40$^a$ to the other side of the film gate, that is, in a position shown in dotted lines at 43$^a$, and in this event the arm 39$^b$ will be depressed in case of a reduction in size of the loop, thereby releasing the link from the shutter.

Having thus described my invention and illustrated its use, what I claim as new and desire to secure by Letters Patent is:

1. In a motion picture projector, a film gate having an aperture, a shutter for closing said aperture, a lever, a link carried by and pivoted on the end of said lever and forming a separable connection to said shutter, and means for disconnecting said link from said shutter.

2. In a motion picture projector, a film gate having an aperture, a shutter for closing said aperture, a lever, a link carried by and pivoted on the end of said lever and forming a separable connection to said shutter, and means for relatively angularly displacing said link and lever for releasing said shutter.

3. In combination with a motion picture projector having a film strip provided with a loop, of a shutter mechanism and means for releasing the shutter when the film is placed under a predetermined tension, said means including an angularly displaceable arm having a hemispherical end portion, a casing receiving said hemispherical end portion, a slidable member in said casing abutting said hemispherical portion and reciprocated thereby upon angular displacement of said arm, and a revoluble shaft connected to and actuated by said reciprocable member.

4. In a motion picture projector having an aperture gate, film feeding mechanism forming a loop in the film, and a light shutter for closing said gate, speed sensitive means and a disconnectible positive connection for connecting said means to and for maintaining said shutter in open position, and means actuated by change in the size of said loop in the film for actuating said connection for disconnection and releasing the shutter irrespective of the position of said speed sensitive device.

5. In a motion picture projector, in combination, a film feeding mechanism and a film strip moved thereby, a film gate having an aperture before which the film strip passes under predetermined tension, a shutter for closing said aperture having a pin thereon, a speed responsive means operated continuously by the film feeding mechanism, a connection between said spaced responsive means and said shutter including a supporting link engaging a pin on the shutter and means operated by contact with the film for displacing said link from engagement with said pin to permit the shutter to close.

6. In a motion picture projector, in combination, a film feeding mechanism and a film strip moved thereby, a film gate having an aperture before which the film strip passes under predetermined tension, a shutter for closing said aperture having a pin thereon, a governor operated continuously by the feeding mechanism, a connection between the governor and said shutter including a pivoted link having a portion engaging said pin, and means operated by variation in the tension of said film for moving said link about its pivot for releasing the pin and thereby the shutter.

7. In a motion picture projector, a film gate having an aperture, a film strip moving across said aperture, means for forming a loop in said film, a shutter for closing said aperture, a governor operated by the projector having a positive connection to and for holding said shutter open, and means including an angularly displaceable arm within the loop operated by a reduction in dimension of said loop for actuating said positive connection for releasing the shutter to close the same irrespective of said governor.

8. In a motion picture projector, a film gate having an aperture, a shutter for closing said aperture, a floating pivot member, a pivoted link on said floating pivot and detachably connected to said shutter for holding it open, a governor operatively connected to said floating pivot member for displacing the pivot of said link, and means for rocking said link about its pivot for releasing the shutter to close.

9. In a motion picture projector, in combination, a film feeding mechanism having a governor, a film gate having an aperture, said film feeding mechanism being adapted to maintain a predetermined tension on the film, a shutter for closing said aperture, a support for said shutter on said aperture gate including a floating pivoted link adapted to be supported in one position by said governor in operation, a detachable connection between said link and said shutter, and means actuated by change in the tension of the film for rocking said link about its pivot independently of the governor for actuating said detachable connection to disconnect said link and shutter.

10. In a motion picture projector, in combination, a film feeding mechanism having a governor, a film gate having an aperture, said film feeding mechanism being adapted to maintain a predetermined tension on the film and to form a loop in the film, a shutter for closing said aperture, a support for said shutter on said aperture gate including a floating pivoted link adapted to be supported in one position by said governor in operation, a detachable connection between said link and said shutter, and means actuated by change in the tension of the film and a reduction in the size of the loop for rocking said link about its pivot independently of the governor for actuating said detachable connection to disconnect said link and shutter.

11. In a motion picture projector, in combination, a film feeding mechanism having a governor, a film gate having an aperture, said film feeding mechanism being adapted to maintain a predetermined tension on the film, a shutter for closing said aperture, a support for said shutter on said aperture gate including a floating pivoted link adapted to be supported in one position by said governor in operation, a detachable connection between said link and said shutter, and means actuated by change in the tension of the film for rocking said link about its pivot independently of the governor for actuating said detachable connection to disconnect said link and shutter, said last mentioned means including a spring restrained sliding rod abutting a part of said link and a member contacting with the film for sliding said rod.

In testimony whereof I have hereunto signed my name.

AUGUSTO DINA.